US012013116B2

(12) United States Patent
Masias et al.

(10) Patent No.: US 12,013,116 B2
(45) Date of Patent: Jun. 18, 2024

(54) FLAME ARRESTORS AND METHODS OF MAKING FLAME ARRESTORS

(71) Applicant: Emerson Process Management Regulator Technologies, Inc., McKinney, TX (US)

(72) Inventors: Justin L. Masias, McKinney, TX (US); Bret M. Kirchner, Dallas, TX (US)

(73) Assignee: Emerson Process Management Regulator Tech Inc., McKinney, TX (US)

( * ) Notice: Subject to any disclaimer, the term of this patent is extended or adjusted under 35 U.S.C. 154(b) by 616 days.

(21) Appl. No.: 17/187,196

(22) Filed: Feb. 26, 2021

(65) Prior Publication Data

US 2022/0275934 A1   Sep. 1, 2022

(51) Int. Cl.

| F23D 14/56 | (2006.01) |
| B23K 26/00 | (2014.01) |
| B23K 26/08 | (2014.01) |
| B23K 26/342 | (2014.01) |
| F23D 14/58 | (2006.01) |
| B23K 101/04 | (2006.01) |
| B23K 103/04 | (2006.01) |

(Continued)

(52) U.S. Cl.
CPC .......... *F23D 14/56* (2013.01); *B23K 26/0093* (2013.01); *B23K 26/08* (2013.01); *B23K 26/342* (2015.10); *F23D 14/58* (2013.01); *B23K 2101/04* (2018.08); *B23K 2103/05* (2018.08); *B33Y 10/00* (2014.12); *B33Y 80/00* (2014.12)

(58) Field of Classification Search
CPC .. A62C 4/00; A62C 4/02; F23D 14/82; F23D 2209/10

USPC .................................................. 431/346, 353
See application file for complete search history.

(56) References Cited

U.S. PATENT DOCUMENTS

| 6,256,883 B1 | 7/2001 | Kinoshita |
| 8,858,224 B2 * | 10/2014 | Mungas ................. F23D 14/82 |
| | | 60/39.1 |
| 9,987,508 B2 | 6/2018 | Cockerham et al. |

(Continued)

FOREIGN PATENT DOCUMENTS

| CA | 2769291 A1 | 1/2011 |
| EP | 3081266 A3 | 10/2016 |

OTHER PUBLICATIONS

International Searching Authority (European Patent Office), "International Search Report and Written Opinion" issued in connection with International Application No. PCT/US2021/063831, dated Apr. 4, 2022, 9 pages.

(Continued)

*Primary Examiner* — Ko-Wei Lin
(74) *Attorney, Agent, or Firm* — HANLEY, FLIGHT & ZIMMERMAN, LLC

(57) ABSTRACT

Flame arrestors and methods of making flame arrestors are described herein. An example flame arrestor includes a cylindrical body. The body includes a first end and a second end opposite the first end. The first end of the body has an end surface. The body also includes a recess formed in the end surface of the first end. The recess is defined by a recessed surface extending inward from the end surface toward the second end. The body further includes a set of channels formed through the body between the first and second ends. The channels extend through the recessed surface.

20 Claims, 6 Drawing Sheets

(51) Int. Cl.
 *B33Y 10/00* (2015.01)
 *B33Y 80/00* (2015.01)

(56) References Cited

U.S. PATENT DOCUMENTS

| | | |
|---|---|---|
| 10,107,417 B2 | 10/2018 | Von Arb |
| 10,391,753 B2 | 8/2019 | Fieldman et al. |
| 2012/0189966 A1* | 7/2012 | Brooker .................. A62C 4/02 |
| | | 222/189.01 |
| 2012/0273239 A1 | 11/2012 | Brennan |
| 2016/0305653 A1* | 10/2016 | Fields ................... F23D 14/825 |
| 2016/0375290 A1* | 12/2016 | Burgett ................... A62C 4/00 |
| | | 29/271 |
| 2018/0056101 A1* | 3/2018 | Cockerham ............ B33Y 80/00 |
| 2018/0078802 A1* | 3/2018 | Licht ........................ A62C 4/00 |
| 2018/0221693 A1* | 8/2018 | Cray ....................... A62C 3/065 |
| 2018/0291933 A1 | 10/2018 | Weickel et al. |
| 2018/0296866 A1* | 10/2018 | Riordan .................. A62C 4/02 |
| 2019/0118469 A1 | 4/2019 | Donovan et al. |
| 2019/0275360 A1* | 9/2019 | Sadinski ................ A62C 3/065 |
| 2019/0299039 A1* | 10/2019 | Johnston ............. B65D 25/385 |
| 2020/0139173 A1 | 5/2020 | Cockerham et al. |

OTHER PUBLICATIONS

Pittman, "Optimizing Machining and Workholding for Metal Additive Manufacturing," Engineering.com, published Dec. 20, 2019, 14 pages.

\* cited by examiner

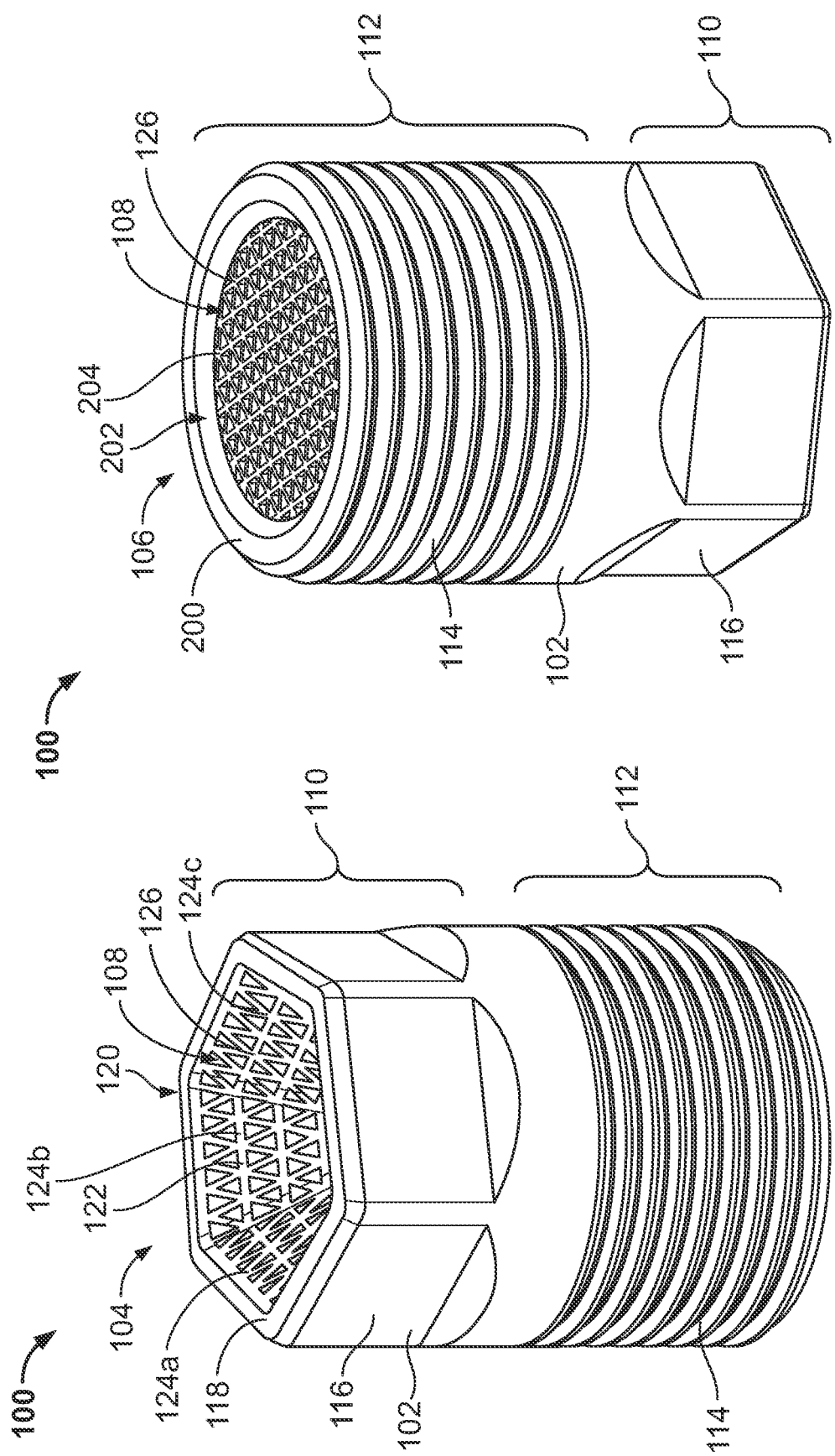

FLAME ARRESTORS AND METHODS OF MAKING FLAME ARRESTORS

FIELD OF THE DISCLOSURE

This disclosure relates generally flame arrestors and methods of making flame arrestors.

BACKGROUND

Valves and other process control devices are commonly used to control the flow of combustible fluids (e.g., natural gas, fuel, etc.). These valves and other process control devices commonly utilize flame arrestors to vent fluid (e.g., gas, liquid moisture, etc.) while preventing or reducing the propagation of a flame or combustion. Typically, a flame arrestor is situated within a passage, such as a vent or drain port. The flame arrestor has a plurality of small channels that allow fluid to flow through the flame arrestor (and, thus, through the passage) but prevent a flame from propagating across the flame arrestor. This prevents or reduces the likelihood of a fire traveling from one area (e.g., an upstream area) to another area (e.g., a downstream area).

SUMMARY

An example flame arrestor disclosed herein includes a cylindrical body. The body includes a first end and a second end opposite the first end. The first end of the body has an end surface. The body also includes a recess formed in the end surface of the first end. The recess is defined by a recessed surface extending inward from the end surface toward the second end. The body further includes a set of channels formed through the body between the first and second ends. The channels extend through the recessed surface.

An example method disclosed herein includes printing, via a three-dimensional (3D) printer, a flame arrestor on a substrate. The flame arrestor includes a cylindrical body. The body includes a first end and a second end opposite the first end. The first end of the body has an end surface. The body also includes a recess formed in the end surface of the first end. The recess is defined by a recessed surface extending inward from the end surface toward the second end. The body further includes a set of channels formed through the body between the first and second ends. The channels extend through the recessed surface.

An example flame arrestor disclosed herein includes a cylindrical body having multiple layers of a same material bonded together. The body includes a first end. The first end has an end surface and a recess extending into the end surface. The end surface forms an outer-most surface of the first end. The recess is defined by a recessed surface. The body has second end opposite the first end. The body also includes a set of channels formed through the body between the first and second ends. The channels extend through the recessed surface such that none of the channels extends through the end surface.

BRIEF DESCRIPTION OF THE DRAWINGS

FIG. 1 is a perspective view of a first end of an example flame arrestor constructed in accordance with the teachings of this disclosure.

FIG. 2 is a perspective view of a second end of the example flame arrestor of FIG. 1.

The figures are not to scale. In general, the same reference numbers will be used throughout the drawing(s) and accompanying written description to refer to the same or like parts.

Figure 3:
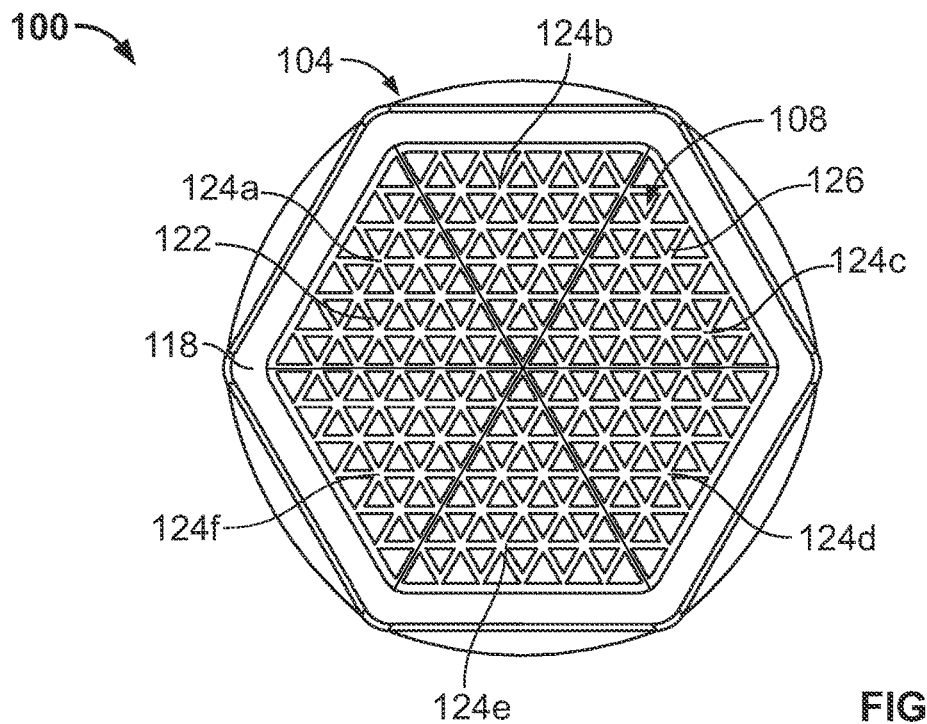
FIG. 3 is an end view of the first end of the example flame arrestor of FIG. 1.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Many valves, process control devices, and other components (e.g., pipes) are used to control the flow of combustible fluids and/or are used in environments with combustible fluids. The components often utilize flame arrestors. Flame arrestors typically have a plurality of small channels. These channels enable fluid to flow across the flame arrestor while preventing or reducing the likelihood of a flame propagating across the flame arrestor, thereby improving safety in the environment.

Some know flame arrestors are manufactured by drilling the channels into a flame arrestor body. However, this process in costly, time consuming, and wasteful of material. Further, the size of the channels is limited by drilling capabilities. Other known flame arrestors are manufactured by crimping sheet metal into a circular pipe plug. This process is also costly and time consuming.

Disclosed herein are example flame arrestors and methods of making flame arrestors. The example flame arrestors disclosed herein are easier and less expensive to manufacture than known flame arrestors. The example flame arrestors also have superior tolerances than known flame arrestors.

Some example flame arrestors disclosed herein are formed via an additive manufacturing process, sometimes referred to as three-dimensional (3D) printing. As used herein, additive manufacturing or 3D printing refers to a manufacturing process that forms an object by adding successive adjacent layers of material (e.g., a same material). The layers are fused or bonded together (e.g., naturally or via a subsequent fusing process) to form the object. The material may be any material, such as metal, plastic, concrete, etc.

Examples of additive manufacturing include Stereolithography (SLA), Selective Laser Sintering (SLS), fused deposition modeling (FDM), and multi-jet modeling (MJM). 3D printing is advantageous because it results in less wasted material than known machining operations. Therefore, 3D printing the example flame arrestor results in a relatively low cost flame arrestor. Further, 3D printing is advantageous because it can be used to form high density features, such as tens, hundreds, or even thousands of small diameter channels (flow paths) in the flame arrestor, which may not be feasible with known machining processes. Smaller diameter channels improve the ability to prevent flame propagation across the flame arrestor. Further, 3D printing results in superior tolerances compared to many other known manufacturing techniques.

Some example flame arrestors disclosed herein include indentations or depressions to help reduce or eliminate the need for post or secondary manufacturing processes. For example, an example flame arrestor disclosed herein includes a cylindrical body with a first end and a second end opposite the first end. The body has a set of channels to allow fluid flow between the first and second ends. In some examples, the first end has a first end surface and a recess or indention that extends into the first end surface. The recess is defined by a recessed surface that extends inward from the first end surface toward the second end. The channels extend through the cylindrical body between the recessed surface and the second end. As such, the openings for the channels are recessed or spaced from the first end surface of the first end. This ensures the channels are not cut and clogged during the manufacturing processes. For example, the flame arrestor may be formed (printed) via a 3D printer in a vertical direction from the first end to the second end. The flame arrestor is formed on a substrate, and then removed from the substrate after the printing process. The flame arrestor can be cut along the first end to remove the flame arrestor from the substrate. Because the recessed surface is spaced from the first end surface of the first end, the cutting tool does not cut through the channels. Otherwise, if the flame arrestor was cut along a cross-section that intersected the channels, the cutting process would inadvertently clog the channels or create burrs in and around the channels, which would require one or more secondary manufacturing processes (e.g., drilling, de-burring, etc.) to clean the channels. Therefore, the recess or indentation reduces or eliminates the need for such secondary manufacture processes, thereby reducing costs associated with manufacture of the flame arrestor.

In some examples, the flame arrestor has a head portion and a threaded portion. The threaded portion may be used to screw the flame arrestor into a threaded opening. The head portion may have a hexagonal or other shaped cross-section to be engaged by a tool when screwing the flame arrestor into or out of the opening. In some examples, the head portion has substantially the same diameter as the threaded portion. This is beneficial during 3D printing because the head portion does not extend laterally outward from the rest of the cylindrical body, which would otherwise require temporary support structure during the 3D printing process. This reduces the total amount of material used to print the flame arrestor, thereby further reducing costs associated with manufacture of the flame arrestor. This also reduces printing time and post-manufacturing time. The example flame arrestors disclosed herein may be formed as plug type flame arrestors, in-line type flame arrestors, and/or any other type of flame arrestors.

Turning now to the figures, FIGS. 1, 2, and 3 illustrate an example flame arrestor 100 constructed in accordance with the teachings of this disclosure. FIG. 1 is a perspective view of one end of the example flame arrestor 100, FIG. 2 is a perspective view of the opposite end of the flame arrestor 100, and FIG. 3 is an end view of the flame arrestor 100. The flame arrestor 100 may also be referred to as a plug, a drain plug, or a drain plug arrestor.

In some examples, the flame arrestor 100 is 3D printed (i.e., constructed via an additive manufacturing process). In such examples, the flame arrestor 100 is composed of multiple layers of a same material bonded together. Example 3D printing operations are disclosed in further detail herein. In some examples, the flame arrestor 100 is a single unitary part or component (e.g., a monolithic structure). In other examples, the flame arrestor 100 can be constructed of multiple parts or components that are coupled together. The flame arrestor 100 can be constructed of various materials. In some examples, the flame arrestor 100 is constructed of or includes stainless steel, such as 316 stainless steel.

In the illustrated example, the flame arrestor 100 includes a body 102. The body 102 can be constructed via 3D printing. The body 102 has a first end 104 and a second end 106 opposite the first end 104. In this example, the body 102 is cylindrical. However, in other examples, the body 102 can be shaped differently (e.g., cuboid). In the illustrated example, the flame arrestor 100 has a set of channels 108 (one of which is referenced in FIGS. 1 and 2) extending through the body 102 between the first and second ends 104, 106. The flame arrestor 100 can included any number of channels (e.g., one, two, three, four, etc.). In some examples, the channels 108 are relatively small (e.g., have a cross-sectional area of 0.01 square inches ($in^2$)). In some examples, the size of the channels 108 is dependent on the type of fluid (e.g., fuel) flowing through the channels 108. The Maximum Experimental Safe Gap (MESG) is a standard way in which fuel mixtures are characterized. In some examples, the channels 108 are larger than the MESG depending on the material and/or the geometry of the flame arrestor 100, but experimentally validated. As such, the channels 108 allow fluid to flow between the first and second ends 104, 106 (and thus, through the flame arrestor 100), but prevent or reduce flames from propagating across the flame arrestor 100.

In the illustrated example, the body 102 has a head portion 110 (a first portion) at or near the first end 104 and a threaded portion 112 (a second portion) at or near the second end 106. The threaded portion 112 has threads 114 that can be used to screw the flame arrestor 100 into a threaded opening, such as a threaded drain or vent passage. In the illustrated example, the head portion 110 has a hexagonal cross-section or profile. As such, the head portion 110 has a set of flattened sides 116 (one of which is referenced in FIGS. 1 and 2). The flattened sides 116 of the head portion 110 may be gripped or engaged by a tool, such as a wrench, for screwing the flame arrestor 100 into or out of a threaded opening. In other examples, the head portion 110 can have a differently shaped cross-section or profile (e.g., triangular, rectangular, star-shaped, etc.). In this example, the flame arrestor 100 is a plug or drain type flame arrestor that can be at least partially inserted (e.g., screwed) into a vent or drain opening. In other examples, the flame arrestor 100 can be used as an in-line flame arrestor, which may be inserted into a pipe or passage between an upstream source and downstream source. In some such examples, the flame arrestor 100 does not have a head portion with a cross-sectional shape for gripping by a tool. Instead, the outside of the body 102 may be substantially smooth or threaded to match the inside of the pipe or passage.

In the illustrated example, the first end 104 has a first end surface 118. The first end surface 118 forms the outer-most surface of the first end 104. The flame arrestor 100 has a first indention or recess 120 formed in (e.g., extending into) the first end surface 118. The first recess 120 is defined by a first recessed surface 122 extending inward from the first end surface 118 toward the second end 106. In the illustrated example, the channels 108 extend through the first recessed surface 122 of the first end 104. In this example, none of the channels 108 extends through the first end surface 118. As a result, the openings for the channels 108 at the first end 104 are recessed or spaced from the first end surface 118 of the first end 104. As shown in further detail herein, this enables the body 102 to be cut from a substrate after a 3D printing process without cutting through the channels 108.

FIG. 3 is an end view of the first end 104 of the example flame arrestor 100. As shown in FIGS. 1 and 3, in this example, the first recessed surface 122 is formed by six triangular surfaces 124a-124f (only triangular surfaces 124a-124c are referenced in FIG. 1, and all of the triangular surfaces 124a-1224f are referenced in FIG. 3). The triangular surfaces 124a-124f extend inward from the first end surface 118 toward the second end 106. In some examples, the triangular surfaces 124a-124f are angled relative to the first end surface 118 by a critical or minimum overhang angle for 3D printing, such as 45°. Because 3D printing involves building layer upon layer of material, 3D printing has limitations with respect to overhung surfaces. Most 3D printers have a critical or minimum overhang angle, such as 45°. Any surface that is to be angled below the minimum printing angle may require temporary supports. Otherwise, the material may yield or fall apart while printing. Therefore, in some examples, the triangular surfaces 124a-124f can be angled with respect to the first end surface 118 by at least the minimum overhang angle for the 3D printer. This reduces or eliminates the need for supports in the printing process, which would otherwise add more material and costs associated with removing the supports. In other examples, the triangular surfaces 124a-124f can be angled at other angles that are greater than the minimum overhang angle, such as 50°, 55°, 65°, etc. In other examples, temporary supports can be used or printed during the 3D printing and the triangular surfaces 124a-124f can be angled at other angles less than the minimum overhang angle, such as 40°, 35°, 30°, etc.

In this example, the first recessed surface 122 is formed by the six triangular surfaces 124a-124f, which matches the hexagonal cross-section of the head portion 110. However, in other examples, the first recessed surface 122 can have any number of triangular surfaces (e.g., three, four, etc.). Further, in other examples, the first recessed surface 122 can be defined by one or more surfaces having other shapes. For example, the first recessed surface 122 can be a hemispherical surface that extends into the first end 104.

As shown in FIG. 2, the second end 106 has a second end surface 200. The second end surface 200 forms the outer-most surface of the second end 106. In this example, the flame arrestor 100 has a second indention or recess 202 formed in (e.g., extending into) the second end surface 200. The second recess 202 is defined by a second recessed surface 204 that is spaced from the second end surface 200.

The channels 108 extend through the second recessed surface 204. Therefore, the openings for the channels 108 at the second end 106 are recessed or spaced from the second end surface 200 of the second end 106. In this example, none of the channels 108 extends through the second end surface 200. In this example, the second recessed surface 204 is parallel to the second end surface 200. However, in other examples, the second recessed surface 204 may be angled or curved relative to the second end surface 200 similar to the first recessed surface 122 relative to the first end surface 118. In other examples, the second end 106 may not have a recess. Instead, the second end surface 200 may be substantially flat or planar across the entire second end 106.

In the illustrated example, the channels 108 have triangular cross-sections. The channels 108 are separated by walls 126 (one of which is referenced in each of FIGS. 1, 2, and 3). In other examples, the channels 108 can have other shaped cross-sections (e.g., circular, rectangular, hexagonal, etc.). In some examples, the cross-sectional size of the channels 108 is constant. In other examples, the cross-sectional size of the channels 108 changes between the first and second ends 104, 106.

Figure 4:
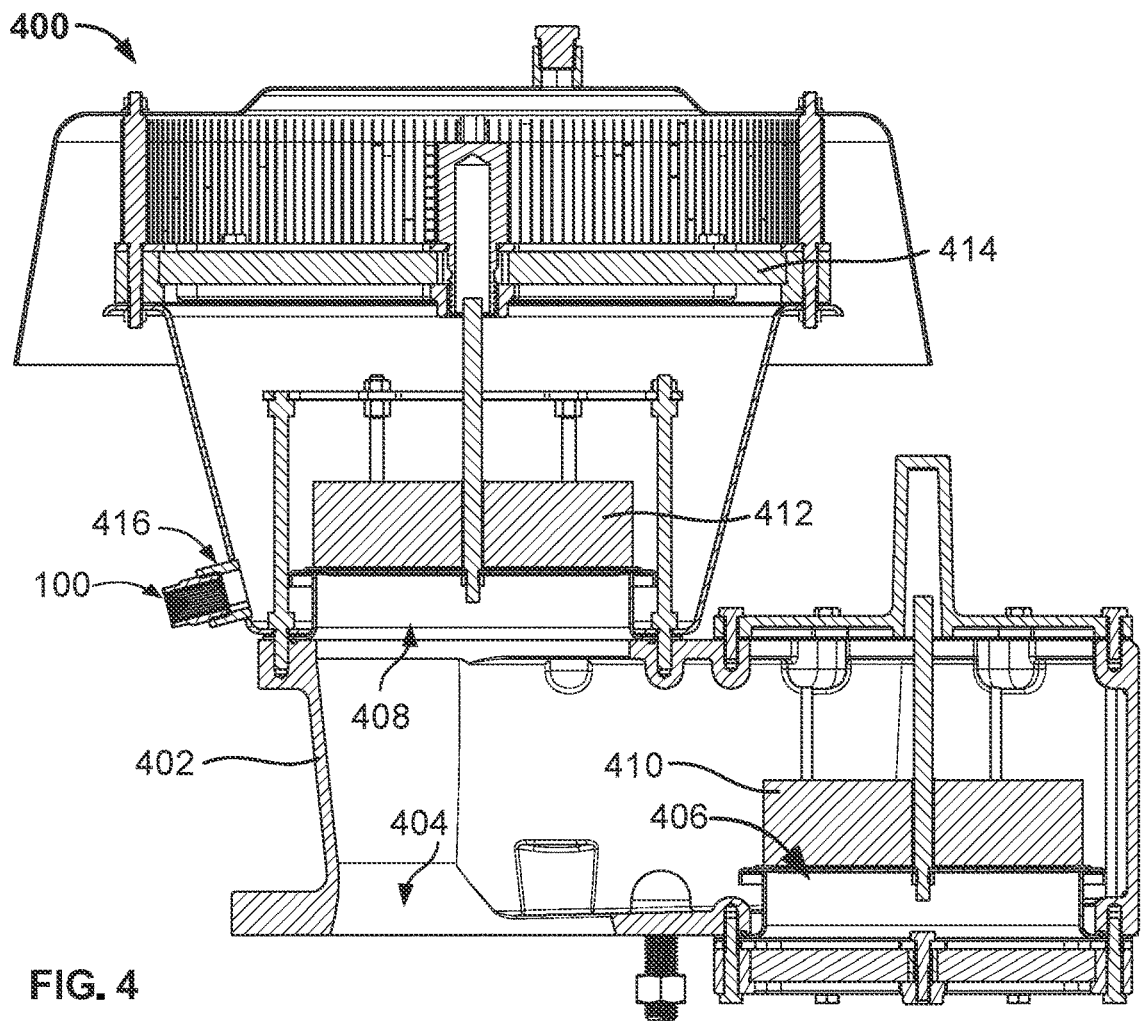
FIG. 4 is a cross-sectional view of an example valve with which the example flame arrestor of FIG. 1 can be used.

FIG. 4 is a cross-sectional view of an example pressure and vacuum relief valve 400 that may utilize the example flame arrestor 100. The valve 400 can be connected to a pressure vessel or tank to regulate the pressure of fluid (e.g., combustible fluid) inside of the tank. The valve 400 has a body 402 with a first port 404 to be fluidly coupled to the pressure vessel, a second port 406 to be fluidly coupled to a downstream area (e.g., a location where the fluid is to be used), and a third port 408 that is vented to atmosphere. A first disc 410, which may be spring loaded, covers the second port 406. If the pressure inside the tank drops below a certain threshold (e.g., a lower pressure limit), the pressure differential moves the first disc 410 upward and away from the second port 406, which enables fluid to flow back into the pressure vessel and, thus, increase the pressure inside the pressure vessel. A second disc 412 covers the third port 408. If the pressure inside the tank exceeds a certain threshold (e.g., an upper pressure limit), the second disc 412 is moved away from the third port 408, which allows the fluid to flow into an upper section of the body 402 and through a flame arrestor 414 to the atmosphere. In the illustrated example, the upper section of the body 402 has a vent opening 416, which is threaded. The example flame arrestor 100 is screwed into the vent opening 416. The vent opening 416 allows moisture and other fluids in the upper section to drain from the valve 400. In particular, the moisture may flow through the channels 108 (FIG. 1) in the flame arrestor 100. However, if a flame occurs outside of the valve 400, the flame arrestor 100 prevents the flame from propagating through the channels 108 to the inside of the valve 400, and vice versa. The example valve 400 is one example use for the flame arrestor 100. However, there exists many other applications for the flame arrestor 100.

Figure 5:
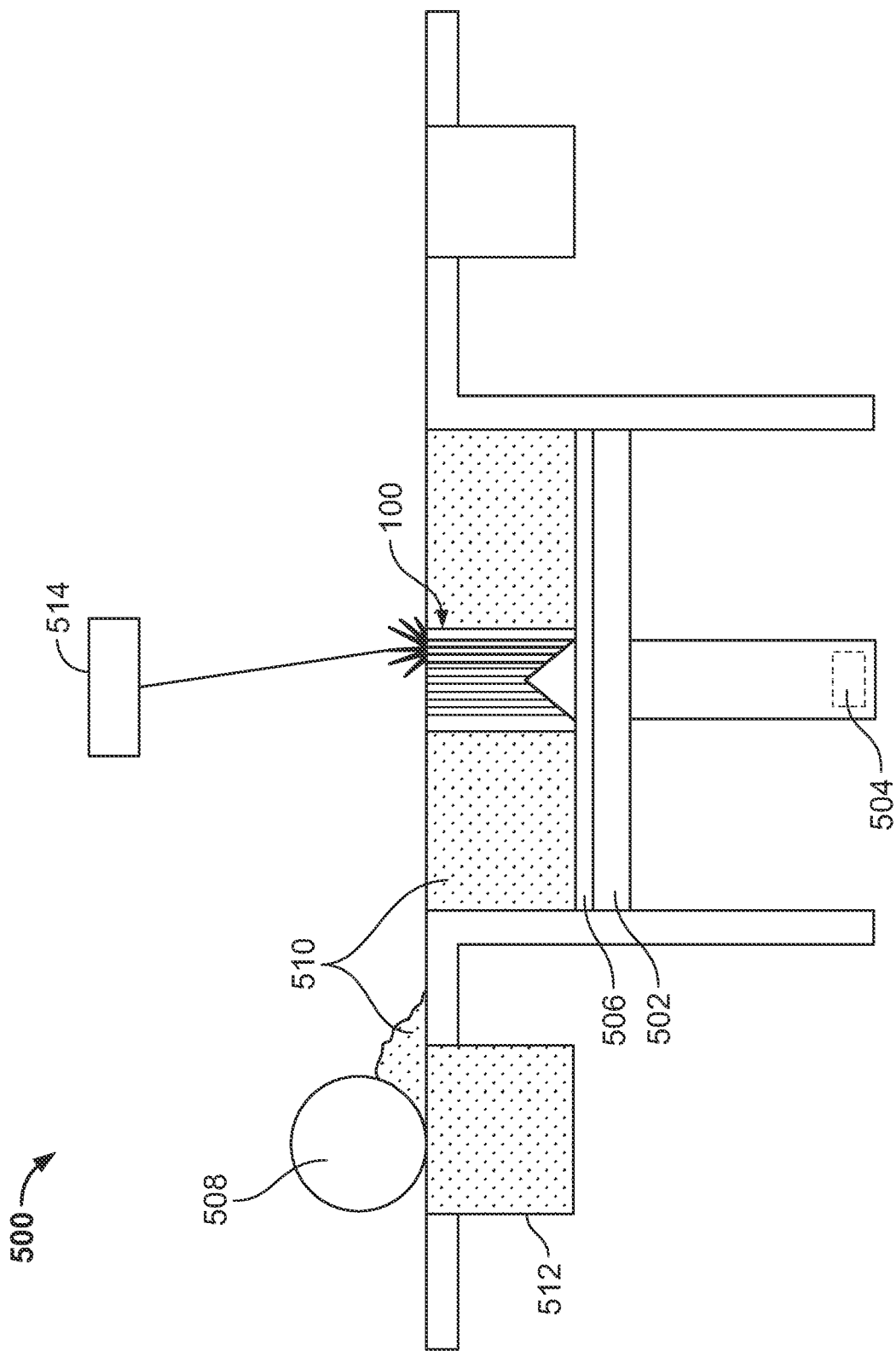
FIG. 5 illustrates an example additive manufacturing machine that can be used to form the example flame arrestor of FIG. 1.

As disclosed herein, the example flame arrestor 100 can be printed or formed via an additive manufacturing machine, commonly referred to as a 3D printer. FIG. 5 illustrates an example powder bed fusion machine 500, which is a type of AM machine or 3D printer, that may be used to print or form the example flame arrestor 100. In the illustrated example, the powder bed fusion machine 500 includes a build platform 502 that is moveable up and down via a platform motor 504. To create one or more objects, such as the flame arrestor 100, a substrate 506 is placed on the build platform 502. The substrate 506 may be, for example, a sheet of metal such as stainless steel. Then, a roller 508 spreads a thin layer (e.g., 40 microns) of powder material 510 from a reservoir 512 (e.g., a hopper) over a top of the substrate 506 and the build platform 502. The powder material 510 can be any metal (e.g., stainless steel) and/or polymer based material. Then, a laser 514 applies energy to the layer of powder material 510 (in the shape of a cross-section of the 3D flame arrestor), which sinters, fuses, and/or otherwise hardens the powder material 510 to form a layer of the flame arrestor 100. In this example, the first layer of the flame arrestor 100 is welded or sintered to the substrate 506. Next, the build platform 502 is moved downward a small amount, (e.g., 0.1 millimeter (mm)) via the platform motor 504, and the roller 508 spreads another layer of the powder material 510 over the build platform 502 and over the first hardened layer(s). The laser 514 then applies energy to the powder material 510 to harden the material onto the previous layer(s). This process is repeated to build the flame arrestor 100 layer-by-layer. Therefore, the flame arrestor 100 can be composed of multiple layers of a same material (e.g., stainless steel) bonded together. In this example, the flame arrestor 100 is built vertically starting from the first end 104.

Other types of powder bed fusion AM processes may be completed by a variety of techniques such as, for example, direct metal laser sintering, electron beam melting, selective heat sintering, selective laser melting, selective laser sintering, etc. Powder bed fusion methods use either a laser or electron beam to melt and fuse material powder together. While some of the example flame arrestors disclosed herein are described as being built by a powder bed fusion AM machine, the example flame arrestors disclosed herein can likewise be implemented with any other type of AM process or machine, such as VAT photopolymerisation, material jetting, binder jetting, material extrusion, sheet lamination, and/or directed energy deposition.

Figure 6:
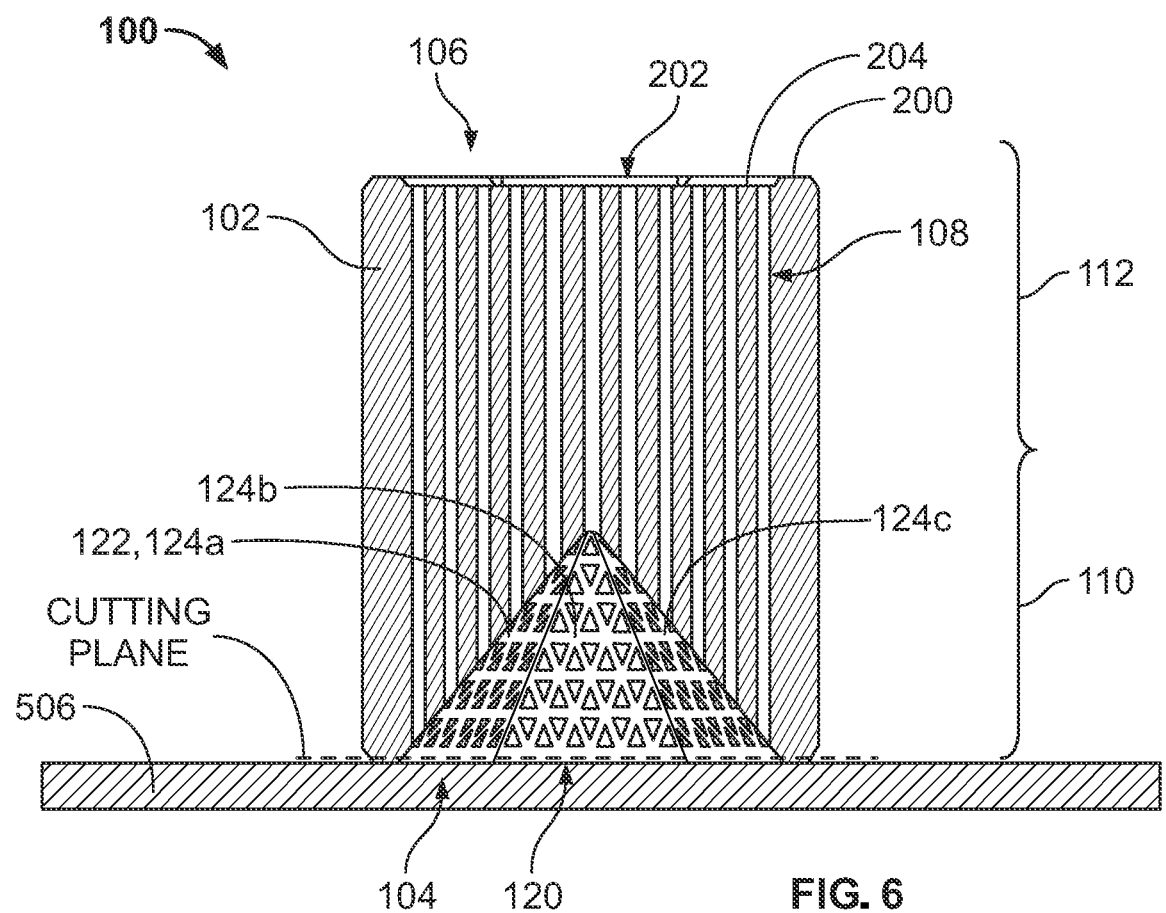
FIG. 6 is a cross-sectional view of the example flame arrestor of FIG. 1 on an example substrate after being formed by the example additive manufacturing machine of FIG. 5.

FIG. 6 is a cross-sectional view of the body 102 the flame arrestor 100 on the substrate 506 after being printed or otherwise formed on the substrate 506 by the powder bed fusion machine 500 (FIG. 5). The body 102 of flame arrestor 100 is printed vertically from the first end 104 to the second end 106. From the printing process, the body 102 is composed of multiple layers of a same material (e.g., stainless steel) bonded together.

As shown in FIG. 6, the first end 104 has the first recess 120 defined by the first recessed surface 122. In this example the first recessed surface 122 includes the triangular surfaces 124a-124f (only the triangular surfaces 124a-124c are shown in FIG. 6 because of the cross-section). As disclosed above, in some examples, the triangular surfaces 124a-124f of the first recessed surface 122 are printed at a minimum overhang angle of the powder bed fusion machine 500, such as 45° relative to the horizontal surface. However, in other examples, the triangular surfaces 124a-124f can be printed at angles that are greater than the minimum overhang angle or less than the minimum overhand angle (e.g., using temporary supports).

As shown in FIG. 6, the second end 106 has the second recess 202 formed in the second end surface 200. The channels 108 extend through the second recessed surface 204 and, thus, are spaced from the second end surface 200. In some examples, this is beneficial when cutting along the second end 106, such as when a stack of flame arrestors are printed (an example of which is disclosed in further detail in connection with FIG. 8). However, in other examples, the second end surface 200 can be substantially flat or planar without a recess.

Figure 8:
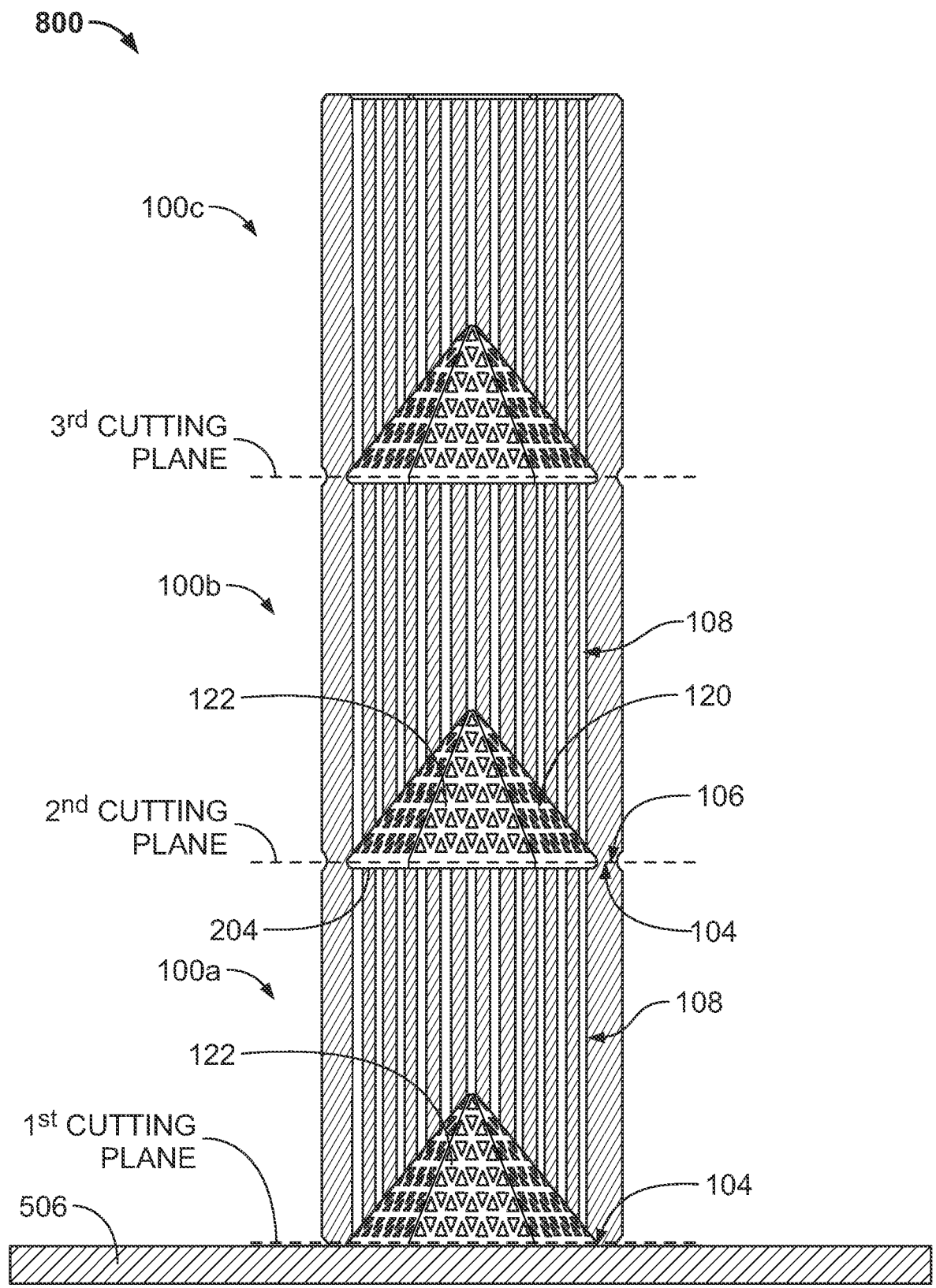
FIG. 8 is a cross-sectional view of a stack of example flame arrestors that can be built by an additive manufacturing machine.

In some examples, the head portion 110 and the threaded portion 112 of the body 102 have the same or substantially the same diameter (e.g., within a printing tolerance for the printing process used). This reduces the total amount of material used to make the flame arrestor 100 compared to flame arrestors that have heads protruding outward from the body 102. Also, if multiple flame arrestors 100 are printed in a vertical stack (such as shown in FIG. 8), this eliminates lateral overhang structures that would require temporary supports during printing.

Because the flame arrestor 100 is printed vertically from the first end 104, the first end 104 is welded, fused, sintered, and/or otherwise coupled to the substrate 506. Therefore, after printing, the flame arrestor 100 is to be removed from the substrate 506. In some examples, the flame arrestor 100 is removed from the substrate 506 using a cutting tool or machine, such as a saw or a grinder. In an example operation, a band saw is used to cut the flame arrestor 100 along a cutting plane (labeled in FIG. 6) that is between the first end 104 and the substrate 506. The cutting plane forms for the first end surface 118 (FIG. 1) of the first end 104. Because the first recessed surface 122 with the channels 108 (one of which is referenced in FIG. 6) is recessed away from the cutting plane, the band saw does not cut through the channels 108, which may otherwise clog the channels 108 and/or create burrs around the channels 108 that would require additional steps to clean. Therefore, the first recess 120 advantageously enables the flame arrestor 100 to be cut from the substrate 506 without the risk of clogging the channels 108.

Figure 7:
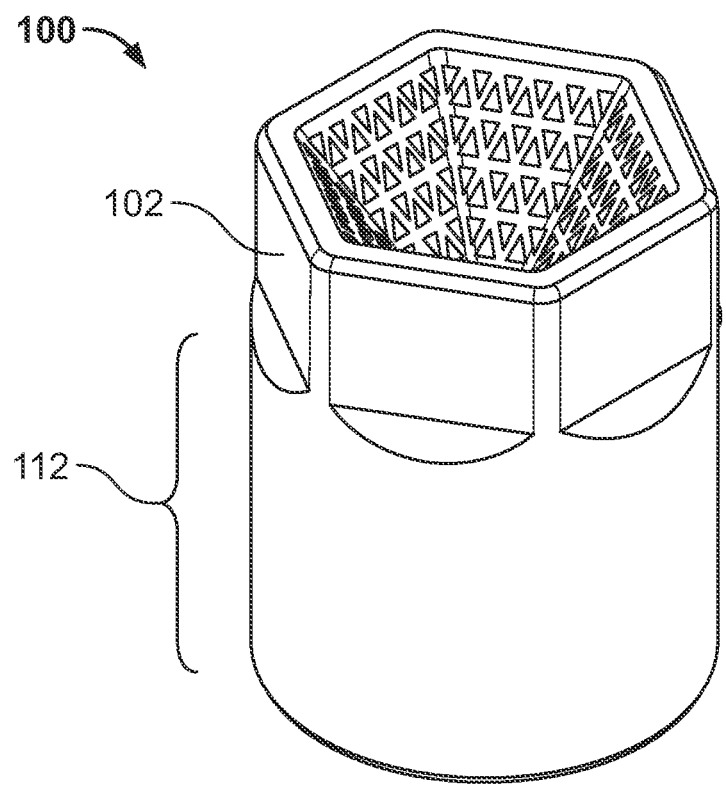
FIG. 7 is a perspective view of the example flame arrestor of FIG. 1 after being removed from the example substrate of FIG. 5.

FIG. 7 is a perspective view of the example flame arrestor 100 after being cut from the substrate 506. In some examples, the threaded portion 112 of the body 102 is printed as a smooth cylinder, and then the threads are cut or formed in the body 102 via a secondary manufacturing process. For example, a thread former or die can be used to forms the threads 114 (FIGS. 1 and 2) in the body 102. In other examples, the threads 114 can be formed during the 3D printing process.

In some examples, multiple flame arrestors can be printed in a vertical stack. For example, FIG. 8 shows an example of a stack 800 of three flame arrestors 100a, 100b, 100c after being printed vertically. This enables multiple flame arrestors to be printed via one printing operation. Each of the flame arrestors 100a, 100b, 100c may be identical to the flame arrestor 100 disclosed herein. The stack 800 may be printed by the powder bed fusion machine 500, for example.

During the printing process, the first flame arrestor 100a of the stack 800 is welded, fused, sintered, and/or otherwise coupled to the substrate 506. After the stack 800 is printed, the individual flame arrestors may be cut apart and finished. For example, a cutting tool (e.g., a band saw) can be used to cut between the first flame arrestor 100a and the substrate 506 along a first cutting plane (labeled in FIG. 8). As disclosed above, because the first recessed surface 122 with the channels 108 is recessed or spaced from the first cutting plane, the cutting tool does not cut through the channels 108 (one of which is referenced in FIG. 8) at the first end 104 of the first flame arrestor 100a. Similarly, the first and second flame arrestors 100a, 100b may be cut apart along second cutting plane (labeled in FIG. 8). Because the second recessed surface 204 of the first flame arrestor 100a is recessed or spaced from the second cutting plane, the cutting tool does not cut through the channels 108 at the second end 106 of the first flame arrestor 100a. Similarly, because the first recessed surface 122 on the first end 104 of the second flame arrestor 100b is recessed or spaced from the second cutting plane, the cutting tool does not cut through the channels 108 (one of which is referenced in FIG. 8) in the second flame arrestor 100b. The second and third flame arrestors 100b, 100c may be similarly separated by cutting along the third cutting plane. The flame arrestors 100a, 100b, 100c can be cut apart in any order.

After the flame arrestors 100a, 100b, 100c are separated from the substrate 506 and each other, a thread former can be used to form the threads on the flame arrestors 100a, 100b, 100c. While in this example the stack 800 included three flame arrestors, in other examples the stack 800 can include any number of flame arrestors (e.g., two, four, five, six, etc.). Further, multiple stacks of flame arrestors may be printed on the substrate 506 at the same time during the same printing process.

Figure 9:
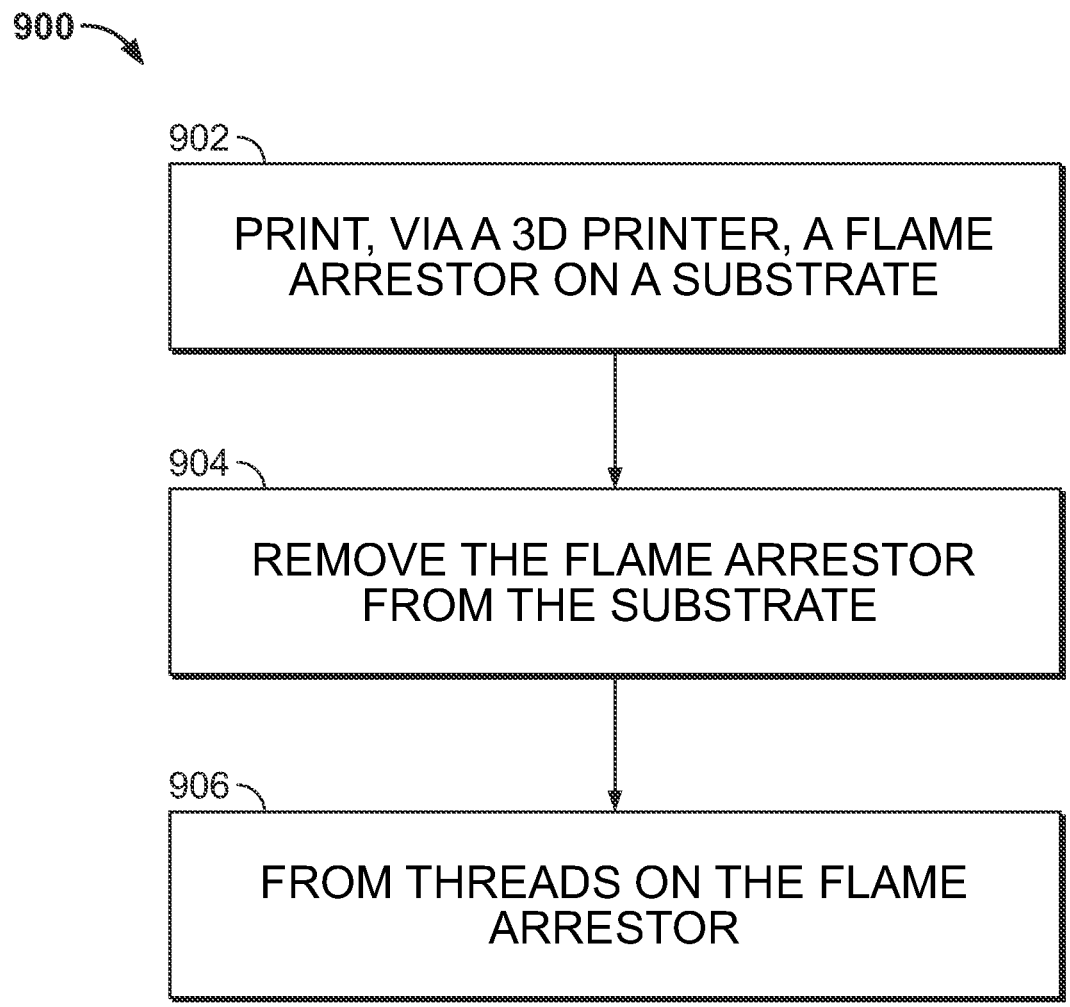
FIG. 9 is a flowchart representative of an example method of manufacturing an example flame arrestor.

FIG. 9 is a flowchart representative of an example method 900 of manufacturing a flame arrestor. The example method 900 is described in connection with the example flame arrestor 100. However, it is understood that the example method 900 may be similarly performed in connection with any other part or component having one or more vertical channels.

At block 902, the example method 900 includes printing, via a 3D printer, a flame arrestor on a substrate. For example, the flame arrestor 100 can be printed via the powder bed fusion machine 500 of FIG. 5. In some examples, the flame arrestor 100 is printed vertically from the first end 104 to the second end 106. In some examples, the flame arrestor 100 is printed using stainless steel. In some examples, multiple flame arrestors can be printed on the substrate 506 as a stack, such as the stack 800 shown in FIG. 8. In some example, one or more stacks of flame arrestors can be printed on the substrate 506 simultaneously.

At block 904, the example method 900 includes removing the flame arrestor from the substrate. For example, the flame arrestor 100 can be removed from the substrate 506 via a cutting tool or machine. In some examples, the flame arrestor 100 is cut from the substrate 506 along a cutting plane between the first end 104 and the substrate 506. This cutting plane forms the first end surface 118 of the first end 104.

In some examples, the flame arrestor 100 is to have threads for threadably inserting the flame arrestor 100 into an opening. In some examples, the flame arrestor 100 is printed without the threads. In such examples, at block 906, the example method 900 includes forming (e.g., via a thread former machine and/or die) the threads 114 on the threaded portion 112 of the body 102.

In some examples disclosed herein the flame arrestor 100 is printed vertically starting with the first end 104. In such examples, the first recess 120 advantageously spaces or separates the channels 108 away from the cutting plane, such that the cutting operation does not cut through the channels 108 when removing the flame arrestor 100 from the substrate 506. However, in other examples, the flame arrestor 100 can be printed vertically starting with the second end 106, and then removed from the substrate 506 by cutting along the second end 106. In such an example, the second recessed surface 204 may be shaped and/or angled similar to the first recessed surface 122 to account for the overhang angle of the printing operation. Further, in such examples, the first end 104 may be flat or planar. For example, the first end surface 118 may be substantially flat or planar without any indentations. In such an example, the openings for the channels may be formed in the first end surface 118.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example flame arrestors disclosed herein are easier and less expensive to manufacture than known flame arrestors. By using 3D printing, the example flame arrestors can be manufactured with high density features (e.g., small diameter channels) that may otherwise not be feasible with known manufacturing techniques. The example flame arrestors also have features that reduce or minimize post-printing processes, thereby further reducing the total time and costs associated with manufacture of the flame arrestors.

The example features and techniques disclosed herein can be used to manufacture other parts or components besides flame arrestors. In particular, any part or component to be 3D printed having one or more small channels can benefit from the example recess feature. The example recess enables the channels to be spaced from the cutting plane such that the channels are not cut, which may otherwise clog or roughen the channels.

Example methods, apparatus, and articles of manufacture have been disclosed herein. Examples and example combinations disclosed herein include:

Example 1 is a flame arrestor including a cylindrical body. The cylindrical body includes a first end, the first end having an end surface, a second end, the second end opposite the first end, a recess formed in the end surface of the first end, the recess defined by a recessed surface extending inward from the end surface toward the second end, and a set of channels formed through the body between the first and second ends, the channels extending through the recessed surface.

Example 2 includes the flame arrestor of Example 1, wherein the flame arrestor is composed of multiple layers of a same material bonded together.

Example 3 includes the flame arrestor of Examples 1 or 2, wherein the flame arrestor includes stainless steel.

Example 4 includes the flame arrestor of any of Examples 1-2, wherein the recessed surface includes triangular surfaces that extend inward from the end surface toward the second end.

Example 5 includes the flame arrestor of Example 4, wherein the triangular surfaces are angled at about 45° relative to the end surface.

Example 6 includes the flame arrestor of any of Examples 1-5, wherein the end surface is a first end surface, the recess is a first recess, and the recessed surface is a first recessed surface, and wherein the second end has a second end surface. The body further includes a second recess formed in the second end surface. The second recess is defined by a second recessed surface. The channels extend through the second recessed surface.

Example 7 includes the flame arrestor of Example 6, wherein the second recessed surface is parallel to the second end surface.

Example 8 includes the flame arrestor of any of Examples 1-7, wherein the channels have triangular cross-sections.

Example 9 includes the flame arrestor of any of Examples 1-8, wherein the body has a head portion at or near the first end and a threaded portion at or near the second end.

Example 10 includes the flame arrestor of Example 9, wherein the head portion and the threaded portion have substantially the same diameter.

Example 11 includes the flame arrestor of Examples 9 or 10, wherein the head portion has a hexagonal cross-section.

Example 12 is a method including printing, via a three-dimensional (3D) printer, a flame arrestor on a substrate. The flame arrestor includes a cylindrical body, the body includes a first end, the first end having an end surface, a second end, the second end opposite the first end, a recess formed in the end surface of the first end, the recess defined by a recessed surface extending inward from the end surface toward the second end, and a set of channels formed through the body between the first and second ends, the channels extending through the recessed surface.

Example 13 includes the method of Example 12, wherein printing the flame arrestor on the substrate includes printing the flame arrestor vertically from the first end to the second end.

Example 14 includes the method of Examples 12 or 13, further including cutting the flame arrestor from the substrate along a cutting plane between the first end and the substrate.

Example 15 includes the method of any of Examples 12-14, further including forming threads on the body.

Example 16 includes the method of any of Examples 12-15, wherein the 3D printer is a powder bed fusion machine.

Example 17 includes the method of any of Examples 12-16, wherein the flame arrestor is printed from stainless steel.

Example 18 is a flame arrestor including a cylindrical body having multiple layers of a same material bonded together, the body including a first end, the first end having an end surface and a recess extending into the end surface, the end surface forming an outer-most surface of the first end, the recess defined by a recessed surface, a second end, the second end opposite the first end, and a set of channels formed through the body between the first and second ends, the channels extending through the recessed surface such that none of the channels extends through the end surface.

Example 19 includes the flame arrestor of Example 18, wherein the recessed surface is formed by triangular surfaces that extend inward from the end surface toward the second end.

Example 20 includes the flame arrestor of Examples 18 or 19, wherein the body has a head portion and a threaded portion that are substantially the same diameter.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A flame arrestor comprising:
   a single unitary cylindrical body, comprising:
   a first end, the first end having an end surface;
   a second end, the second end opposite the first end;
   a recess formed in the end surface of the first end, the recess defined by a recessed surface extending inward from the end surface toward the second end; and
   a set of channels formed through the body between the first and second ends, the set of channels extending through the recessed surface.

2. The flame arrestor of claim 1, wherein the flame arrestor is composed of multiple layers of a same material bonded together.

3. The flame arrestor of claim 2, wherein the flame arrestor includes stainless steel.

4. A flame arrestor comprising:
   a cylindrical body, comprising:
   a first end, the first end having an end surface;
   a second end, the second end opposite the first end;
   a recess formed in the end surface of the first end, the recess defined by a recessed surface extending inward from the end surface toward the second end, wherein the recessed surface includes triangular surfaces that extend inward from the end surface toward the second end; and
   a set of channels formed through the body between the first and second ends, the set of channels extending through the recessed surface.

5. The flame arrestor of claim 4, wherein the triangular surfaces are angled at about 45° relative to the end surface.

6. The flame arrestor of claim 1, wherein the end surface is a first end surface, the recess is a first recess, and the recessed surface is a first recessed surface, and wherein the second end has a second end surface, the body further including a second recess formed in the second end surface, the second recess defined by a second recessed surface, the set of channels extending through the second recessed surface.

7. The flame arrestor of claim 6, wherein the second recessed surface is parallel to the second end surface.

8. The flame arrestor of claim 1, wherein each of the channels of the set of channels has a triangular cross-section.

9. The flame arrestor of claim 1, wherein the body has a head portion at or near the first end and a threaded portion at or near the second end.

10. The flame arrestor of claim 9, wherein the head portion and the threaded portion have substantially the same diameter.

11. A flame arrestor comprising:
   a cylindrical body, comprising:
     a first end, the first end having an end surface;
     a second end, the second end opposite the first end;
     a recess formed in the end surface of the first end, the recess defined by a recessed surface extending inward from the end surface toward the second end; and
     a set of channels formed through the body between the first and second ends, the set of channels extending through the recessed surface, wherein the body has a head portion at or near the first end and a threaded portion at or near the second end, and wherein the head portion has a hexagonal cross-section.

12. A method comprising:
   printing, via a three-dimensional (3D) printer, a flame arrestor on a substrate, the flame arrestor including a single unitary cylindrical body, the body including:
     a first end, the first end having an end surface;
     a second end, the second end opposite the first end;
     a recess formed in the end surface of the first end, the recess defined by a recessed surface extending inward from the end surface toward the second end; and
     a set of channels formed through the body between the first and second ends, the set of channels extending through the recessed surface.

13. The method of claim 12, wherein printing the flame arrestor on the substrate includes printing the flame arrestor vertically from the first end to the second end.

14. The method of claim 12, further including cutting the flame arrestor from the substrate along a cutting plane between the first end and the substrate.

15. The method of claim 12, further including forming threads on the body.

16. The method of claim 12, wherein the 3D printer is a powder bed fusion machine.

17. The method of claim 12, wherein the flame arrestor is printed from stainless steel.

18. A flame arrestor comprising:
   a single unitary cylindrical body having multiple layers of a same material bonded together, the body including:
     a first end, the first end having an end surface and a recess extending into the end surface, the end surface forming an outer-most surface of the first end, the recess defined by a recessed surface;
     a second end, the second end opposite the first end; and
     a set of channels formed through the body between the first and second ends, the set of channels extending through the recessed surface such that none of the channels extends through the end surface.

19. The flame arrestor of claim 18, wherein the recessed surface is formed by triangular surfaces that extend inward from the end surface toward the second end.

20. The flame arrestor of claim 18, wherein the body has a head portion and a threaded portion that are substantially the same diameter.

\* \* \* \* \*